United States Patent [19]

Yamamoto et al.

[11] 4,313,073
[45] Jan. 26, 1982

[54] INTERACTIVE GRAPHIC APPARATUS

[75] Inventors: Kiyokazu Yamamoto, Urawa; Takushi Fukami, Chiba; Teruo Takashima, Yokohama, all of Japan

[73] Assignees: Toppan Printing Co., Ltd.; Watanabe Instruments Corp., both of Tokyo, Japan

[21] Appl. No.: 90,747

[22] Filed: Nov. 2, 1979

[30] Foreign Application Priority Data

Mar. 1, 1979 [JP] Japan ............................. 54-22539

[51] Int. Cl.³ ............................................ G05B 19/36
[52] U.S. Cl. .................................. 318/577; 318/640; 250/202
[58] Field of Search ............... 318/577, 568, 640, 587; 33/1 M, 23 C; 250/202

[56] References Cited

U.S. PATENT DOCUMENTS

| | | | |
|---|---|---|---|
| 3,328,801 | 6/1967 | Boyle et al. | 346/31 |
| 3,614,372 | 10/1971 | Dulebohn | 318/577 X |
| 3,636,256 | 1/1972 | Cameron | 178/18 |
| 3,691,901 | 9/1972 | Shelton | 318/577 X |
| 3,693,066 | 9/1972 | Friedman | 318/576 |
| 3,936,712 | 2/1976 | Gerber et al. | 318/568 |
| 3,982,165 | 9/1976 | Rich | 318/577 X |
| 4,151,451 | 4/1979 | Maertins et al. | 318/640 X |

Primary Examiner—B. Dobeck
Attorney, Agent, or Firm—Bacon & Thomas

[57] ABSTRACT

Disclosed is an interactive graphic apparatus for obtaining a desired formal drawing from a manuscript bearing rough drawings depicted thereon. In this apparatus, the operator can automatically draw onto a drawing paper put on a drawing table, on the basis of the positional information items of drawings on a manuscript disposed on a reading table and the functional information items inputted from a key board. The apparatus has particularly three component elements of digitizer, controlling device and plotter incorporated into an integral desk-like structure and various operational functions, whereby the interaction of the apparatus is improved.

16 Claims, 12 Drawing Figures

FIG. 3
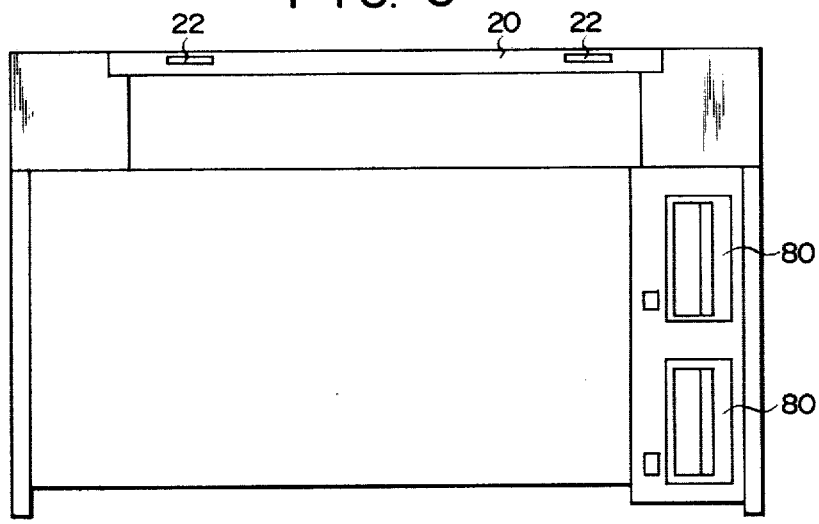
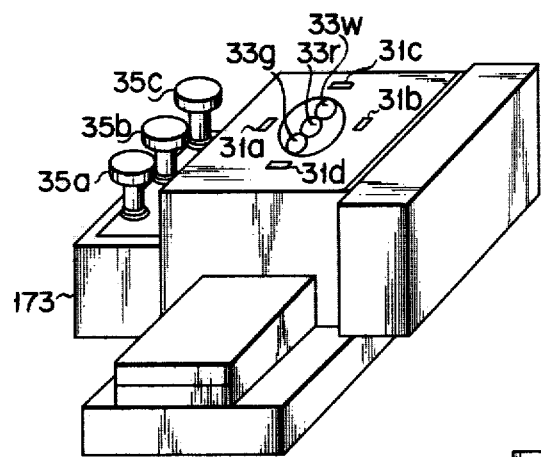
FIG. 4
FIG. 5
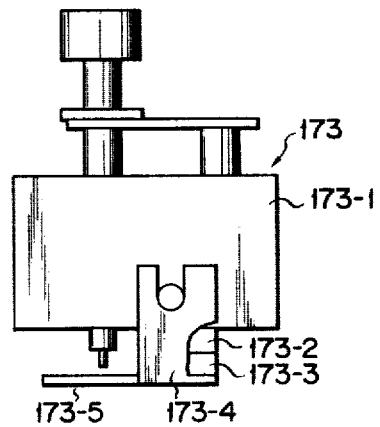

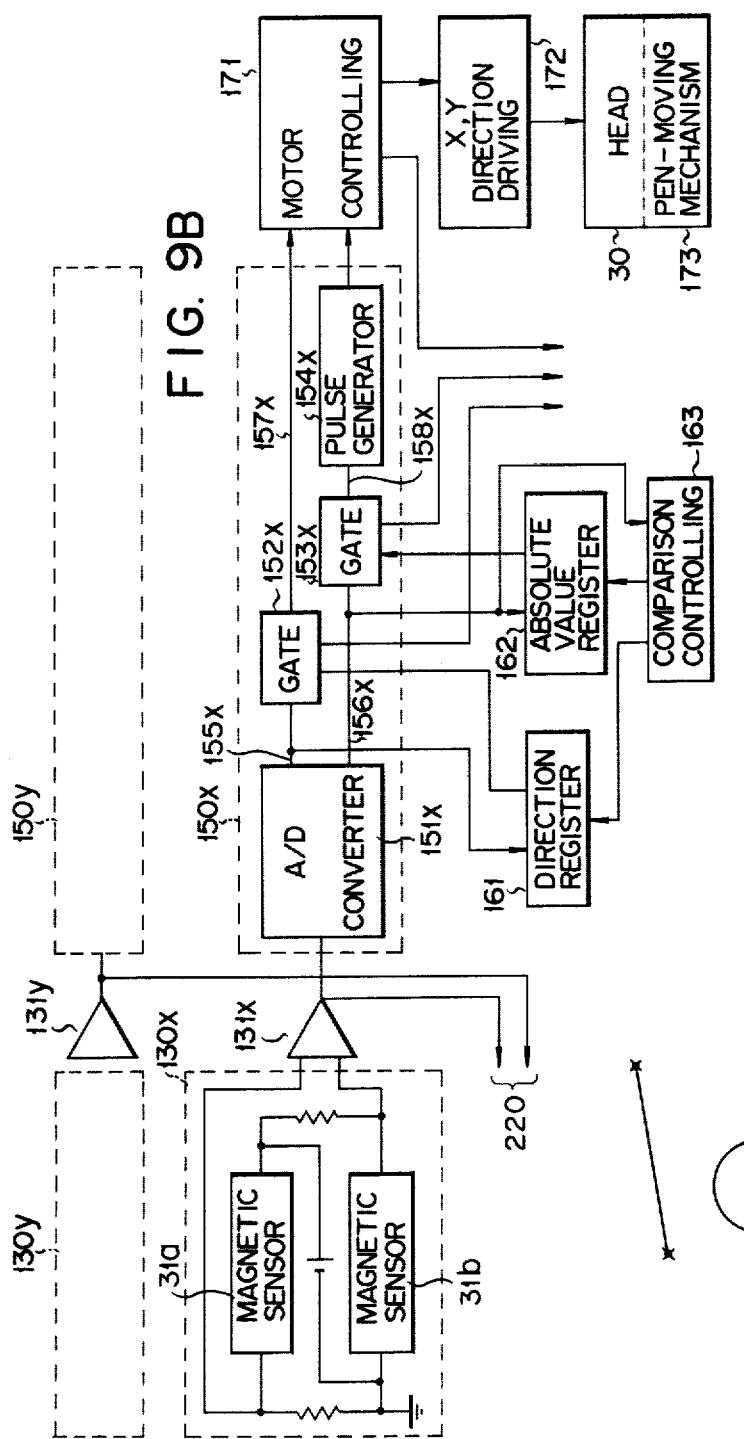

INTERACTIVE GRAPHIC APPARATUS

This invention relates to an interactive graphic apparatus for formally drawing a rough figure or figures drafted by, for example, a free hand.

In the case of, for example, printing, lineal drawings such as frames, ruled lines, on figure patterns are written by a free hand and it is necessary to formally draw on a sheet such draft or manuscript in which the position and cofiguration of the frame, the position and interval of the ruled lines, and the like are designated by means of letters, notations, numerals or the like, thereby to obtain a block copy. Conventionally, such formal drawing as a whole is carried out by a drawer, manually. Therefore, the operability is low and yet the drawn block copy decreases in the drawing precision or accuracy. Under these circumstances, there has recently been developed an automatic drawing machine which is intended to automatize the production of a formal drawing. This type of drawing machine comprises a digitizer for measuring the position coordinate of a rough figure draft, a controlling device for subjecting the positional and functional information from the digitizer, which has a key board for inputting functional information, and a plotter for performing the drawing operation in accordance with the information from the controlling device. Since, however, the digitizer, controlling device and plotter constituting the conventional automatic drawing machine each have an independent structure, the machine becomes large in size, inconvenient in handling and high in manufacturing cost. Further, conventionally, a small-sized machine having no cathode ray tube for the same purpose has also been developed in which however, the interaction of the machine is low with the result that reading operation is extremely difficult.

Accordingly, an object of the invention is to provide an interactive graphic apparatus which is small in size, low in manufacturing cost and yet excellant in interaction.

Another object of the invention is to provide an interactive graphic apparatus which has a digitizer, control device and plotter integrally incorporated into a desk form.

A still another object of the invention is to provide an interactive graphic apparatus which has the function that at the time of reading informaion of a drafted figure or figures it can display on its head the state of the head following a cursor and the state of the head-follow completion.

A further object of the invention is to provide an interactive graphic apparatus having the correcting function in which at the time of correcting part of the read figure portion this figure part is displayed by the moving locus of the lamp disposed on the head to permit the operator to recognize the position of the figure part and erase that part, thereby to perform the correcting operation with respect to that part.

A still further object of the invention is to provide an interactive graphic apparatus having the positional coincidence informing function in which when at the time of reading a figure draft the head has been brought to a position corresponding to a predetermined framed figure draft portion (gridded figure draft portion), the apparatus informs the operation of the positional coincidence by the buzzer ringing and by which it is made possible to frame or grid a plurality of such figure portions depicted on the manuscript.

A still further object of the invention is to provide an interactive graphic apparatus having the read point informing function in which when at the time of reading a figure draft point the head has been brought to the position of a read point, the apparatus informs the operator that that position has been read and by which the operator is prevented from twice reading the same figure point or from missing reading the figure point desired to be read and by which where twice reading is necessary the operation can bring the position of the second read point exactly into coincidence with the position of the first read point.

A still further object of the invention is to provide an interactive graphic apparatus having the automatic head-follow function in which when at the time of reading a drafted figure cursor has gone beyond the head-followable range, the head automatically moves at a specified speed in the moving direction to be taken at that time and, when the cursor having fallen under the head-followable range, starts to follow the cursor.

This invention can be more fully understood from the following detailed description when taken in conjunction with the accompanying drawings, in which:

FIG. 3 is a front view of the apparatus of FIG. 1;

FIG. 4 is a perspective view of a head provided in the apparatus of FIG. 1;

FIG. 5 is a side view of a pen structure of the apparatus;

FIGS. 9A and 9B are block circuit diagrams for the apparatus of FIG. 1;

FIG. 11 is a view illustrating the sequential input order display function of the apparatus of FIG. 1.

Figure 1:
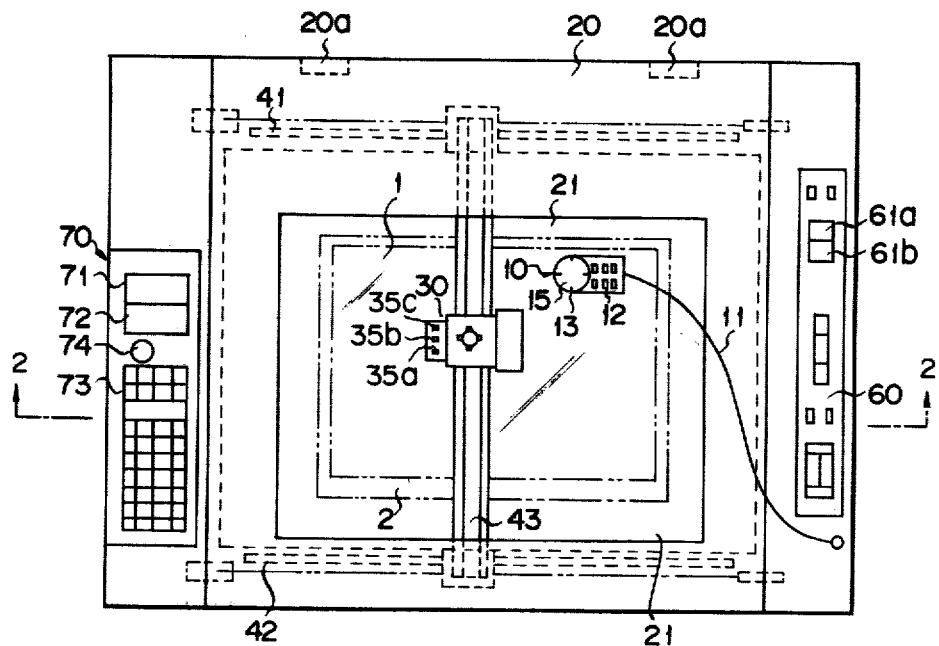
FIG. 1 is a plan view of an interactive graphic apparatus according to an embodiment of the invention.
Figure 2:
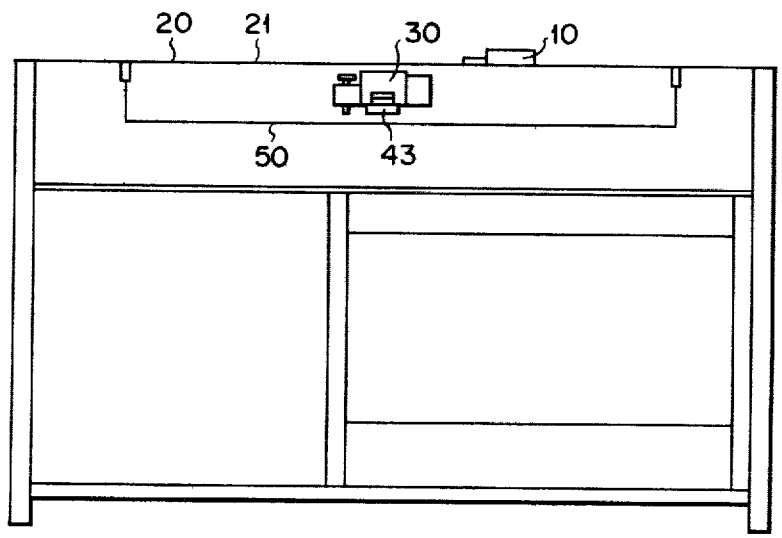
FIG. 2 is a cross-sectional view along a line 2—2 of the apparatus of FIG. 1.

As shown in FIGS. 1, 2, and 3, a reading table 20 is disposed on the upper surface of an interactive graphic apparatus according to an embodiment of the invention. Substantially at the central part of the reading table 20 is disposed a reading plate 21 constituted by a transparent plate such as a glass plate. On the reading plate 21 is mounted a manuscript (draft) 1 (shown by one-dot chain line) which has a rough figure drawn by, for example, a free hand. At the rear portion of the reading table 20 are provided hinges 20a, and when handles 22 provided at the forward portion of the reading table 20 is lifted up, the reading table 20 is opened at an angle of approximately 60°. This opened state of the reading table 20 is kept as it stands by means of a holding member (not shown). Replacement of a drawing paper 2 and a tubular-tip drawing pen 35 can be carried out by opening the reading table 20. On the reading table 20 is provided a cursor 10 for indicating the position of the figure depicted on the manuscript 1. The cursor 10 can manually be moved to a given position taken on the reading table 20 and is connected to a main proper of the graphic apparatus through a cable 11. At the tip end of the cursor is provided a transparent window 15 which is formed with a crossed rule, and around which is disposed a coil 13. In this case, it is necessary that the coil 13 be disposed around the transparent window 15 so as to permit its magnetic center to accord with an intersection of the crossed two lines of the crossed rule of the transparent window 15.

A head 30 is disposed at the underside of the reading table 20. This head is provided on a carriage 43 so as to be movable along the Y axis, which carriage is provided, so as to be movable along the X axis, on two rails 41, 42 disposed in parallel along the X axis. Accordingly, the head 30 is movable in both X- and Y-axial directions. The movement of the head 30 is controlled by a pulse motor which is placed under the control of a controlling device. On the head 30 are provided four magnetic sensors (for example, hall element) for sensing the magnetism of the coil 13 provided for the cursor 10, as shown in FIG. 4. Namely, the sensors $31a$ and $31b$ are disposed in the X-axial direction, while the sensors $31c$ and $31d$ in the Y-axial direction. At the inside of these arranged sensors $31a$ to $31d$ are disposed a window, within which are disposed a plurality of color lamps such as red, white and green color lamps $33r$, $33w$ and $33g$. On the red color lamps $33r$ thus centrally disposed is disposed a glass plate $33a$ formed with a crossed rule, on which glass is disposed a Fresnel lens (convex lens) $33d$. This permits the crossed rule indication of the glass plate $33a$ to be projected onto the back surface of the manuscript 1 at the time when the red color lamp $33r$ is lit, whereby said crossed rule indication is sensed or perceived by an operator through the manuscript 1, so that the operator recognizes the central position of the head. At the side of the head 30 are disposed a plurality of tubular-tip drawing pens $35a$, $35b$ and $35c$ having differently thick pen points which are allowed to about on the drawing paper 2 by operation of a vertically pen-moving mechanism 173 placed under control of a controlling device. In this case, the drawing paper 2 is mounted upon a drawing table 50. There is a space portion between the drawing table 50 and the reading table 20, which space portion advantageously acts on preventing the disabling of pen writing due to the desiccation of the tubular-tip drawing pen and the stop-up of the pen points, such disabling having hetherto raised a problem in the art of a general type drawing apparatus. According to the invention, such a particular mechanism as shown in FIG. 5 is given to the tubular-tip drawing pen so as to prevent the disabling of pen writing.

Figure 6:
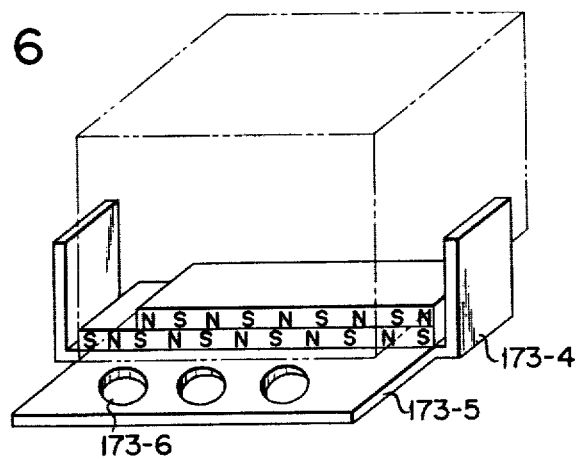
FIG. 6 is a perspective view of part of the pen structure.
Figure 7:
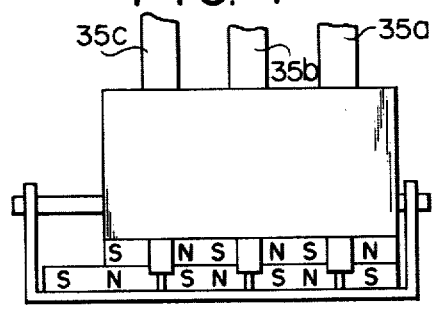
FIGS. 7 and 8 are front views of the pen structure.
Figure 8:
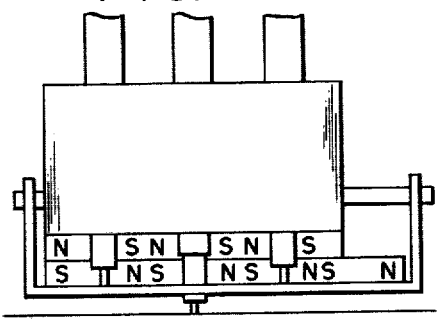

Referring to FIG. 5, a permanent magent 173-2 is provided on the bottom of a pen holder 173-1 in the pen vertically-moving mechanism 173. Another permanent magnet 173-3 is also provided on a pen-stopper member 173-4 provided at the lower part of the pen holder 173-1. A plurality of apertures 173-6 is provided in a stopper plate 173-5 of the pen stopper member 173-4, as shown in FIG. 6. These apertures 173-6 are each so provided as to permit the pen point of the tubular-tip drawing pens $35a$, $35b$ or $35c$ to be inserted thereinto depending upon the position of the stopper member 173-4. For instance, when the stopper member 173-4 is in such a positional relationship with the pen holder 173-1 as shown in FIG. 7, the pen point of the pen abuts on the stopper plate 173-5. When in this state the stopper member 173-4 is pushed rightwardly of the illustration, it is moved rightwards. At this time, the permanent magnet of the pen holder 173-1 and that of the stopper member 173-4 come into a relationship of "S—S" pole v. "N—N" pole, and are thus brought into a state of mutual repulsion. Thereafter, the former and the latter permanent magnets are returned to a state of mutual attraction to cause a change in position to the stopper member 173-4 as shown in FIG. 8. In this stae, the pen point of the pen is situated right above the aperture 173-6 and when the pen is lowered by actuation of the pen vertically-moving member, its point comes to abut on the drawing paper after passing through the aperture 173-6.

Where no writing operation such as mentioned above is performed, the point of the pen is allowed to abut against the stopper plate 173-5 of the stopper member 173-4. This abutment of the pen point serves to prevent the desiccation of the pen and the stop-up or blocking of its pen point. When the graphic apparatus is employed under a specific circumstance in which the pen would become dry even if a member such as the stopper member 173-4 is provided in the apparatus, moisture control is made of the above-mentioned hermetically closed on sealed space portion, which would prevent the desiccation of the pen.

On the right side portion of the reading table 20 is disposed an operating panel 60 provided with switches, display lamps, etc. for carrying out necessary operations for the graphic apparatus. On the left side portion of the reading table 20 is disposed a key panel 70 provided with a position display 71 for showing the X-Y co-ordinate of the existing or current position of the head 30, a function display for showing the functions as later described and a keyboard for entry of input data. Further, a plurality of external memories 80 of the proppy-disk type are provided on the right-forward portion of the graphic apparatus. Further, at the interior portion of the apparatus below the drawing table 50 is received a controlling device for making control of the apparatus as a whole.

As will be apparent from the foregoing structure of the graphic apparatus, the apparatus of the invention takes the configuration of an ordinary desk. If, therefore, a chair is put in front of the apparatus, the drawer will be able to operate for himself the apparatus while he is seating himself on the chair.

Hereinafter, the controlling devices and peripheral parts and sections of the above-mentioned interactive graphic apparatus will be described by reference to FIGS. 9A and 9B.

An X-axis error sensing or detecting device $130x$ is comprised of a bridge circuit including the magnetic sensors $31a$ and $31b$ disposed in the X-axial direction. The output of the X-axis error sensing device is connected to an A/D converter $151x$ of an X-axis drive controlling device $150x$ through an amplifier $131x$. One output of the A/D converter $151x$ is connected to a direction register 161 through a lead $155x$ and also to a motor controlling circuit 171 through a gate $152x$ and a lead $157x$. The other output of the A/D converter $151x$ is connected to an absolute value register 162 and a comparison controlling section 163 through a lead $156x$ and also to the motor controlling circuit 171 through a gate $153x$, lead $158x$ and pulse generator $154x$ in that order. The gate $152x$ is connected to the output of the direction register 161 and to one output of an increment operation section 191. The gate $153x$ is connected to the output of the absolute value register 162 and the other output of the increment operation section 191. The comparison controlling section 163 is connected to the absolute value register 162 and to the direction register 161. The respective constructions and operations of a Y-axis error sensing device $130y$, amplifier $131y$ and Y-axis drive controlling device 150y are the same as those of provided with respect to the X-axis, and description of these is omitted. The outputs of the amplifiers 131x and 131y are connected to an informing logic circuit 220.

One output of the motor controlling circuit 171 is connected to the head through an X- and Y-direction driving device 172 and the other output thereof is connected to a position co-ordinate register 183a through an XY counter 180, a read-out controlling section 181 and co-ordinate conversion section 182 in that order. One output of the XY counter 180 is connected to the position display 71 and the other output thereof is connected to the increment operation section 191. The position coordinate reggister 183a is connected to a grid operation section 188, a domain operation section 183b, a read point operation section 185 and a function operation section 190. The domain operation section 183b is further connected to the read point operation section 185 through a read point register 184. The read point operation section 185 and one of the outputs of the key board 73 is further connected to informing logic circuit 220.

The outputs of the informing logic circuit 220 are connected to color lamps 33w, 33r and 33g, respectively, through leads 221w, 221r and 221g and their corresponding lamp driving circuits 230w, 230r and 230g. The input of a grid domain operation section 186 is connected to the key board 73 and the output thereof is connected to the grid operation section 188 through a grid register 187. The output of the grid operation section 188 is connected to a buzzer 74. The input of a function controlling section 189 is connected to the key board 73 and the output thereof is connected to the function display 72 and also to the function operation section 190. The output of this section 190 is connected to an external memory 80. A drawing controlling section 193 is connected to the external memory 80 and also to the key board 73 and further to a drawing-correction controlling section 192. The input of the drawing correction controlling section 192 is connected to correction switches 61a and 61b and the output thereof is connected to the increment operation section 191 and also to the vertically pen moving mechanism 173. The correction switch 61a is connected to a lamp driving circuit 220r through a lead 221r. The key board 73 is connected to the informing logic circuit 220 and the read-out controlling section 181. The key board 12 of the cursor 10 is connected to the key board 73.

Hereinafter, the operation of the interactive graphic apparatus having the foregoing construction will be explained. When the cursor 10 shown in FIG. 1 is placed on the reading table 20 and situated within the region where the magnetic sensors 31a and 31b of the head 30 are capable of magnetically sensing action, the center of the head 30 is capable of magnetically sensing action, the center of the head 30 is moved toward a central position of the coil 13 of the cursor 10 at a speed corresponding to the positional difference on error between the cursor 10 and the head 30. When both the head center and the central coil position have coincided with each other, the head ceases to move. Hereinbelow, we will explain the X-directional operation of the cursor 10 unless particularly stated but the same explanation would also apply to the Y-directional cursor operation.

Figure 9A:
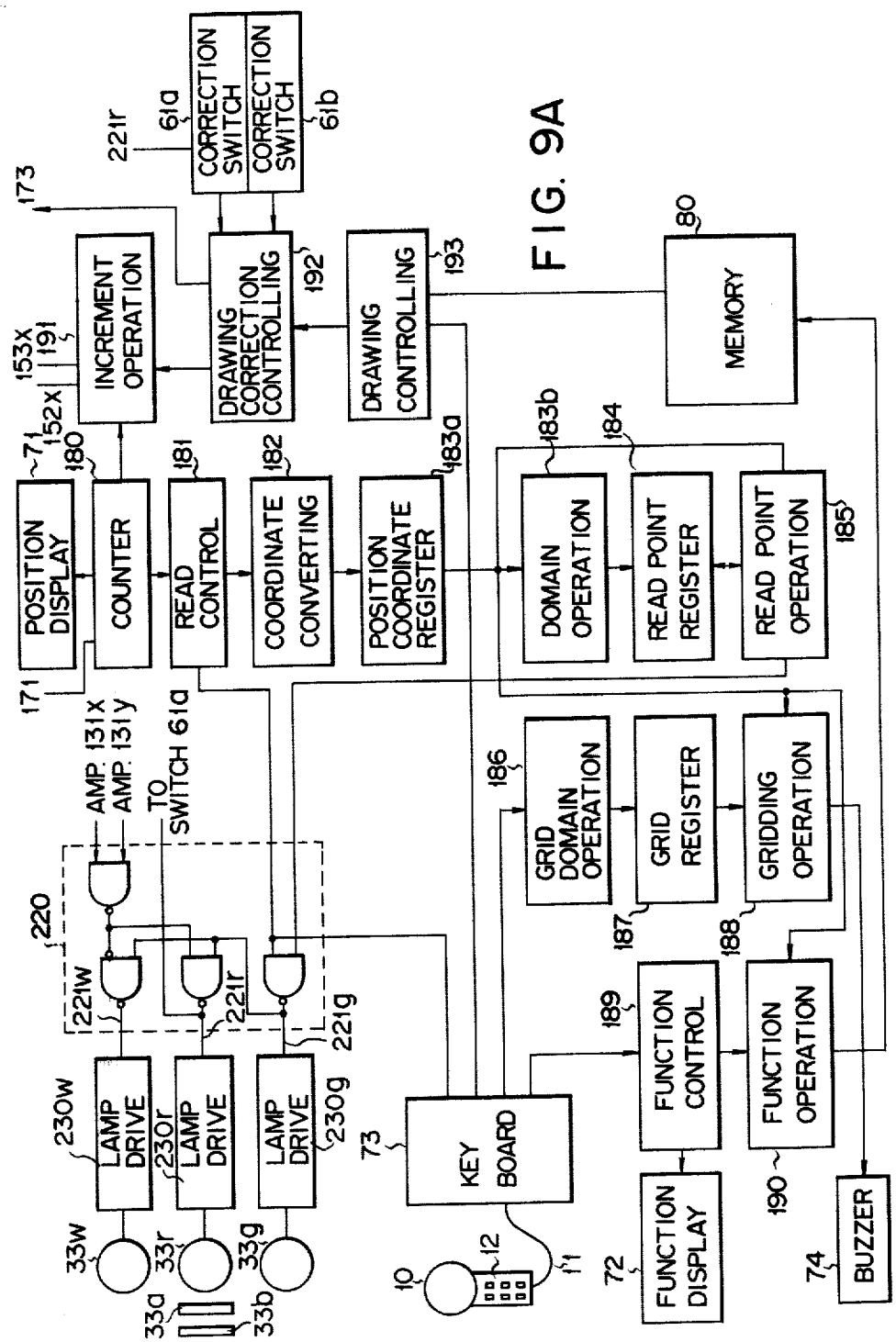

Referring to FIGS. 9A and 9B, a signal corresponding to the difference between the resistance values of the sensors 31a, 31b which are obtained in correspondence to magnetism generated from the coil 13 of the cursor 10 is outputted from the X-axis error sensing device 130x comprised of a bridge circuit and supplied to the amplifier 131x. The output signal of the amplifier 131x is converted by the A/D converter 151x into a digital signal corresponding to the absolute value of that output signal and also into a signal corresponding to + or − sign of that signal. This digital signal is converted by the pulse generator 154x into a pulse signal having a frequency corresponding to the absolute value, which pulse signal is supplied to the motor controlling circuit 171 together with the sign signal. Thus, the motor controlling circuit 171 executes the operation for giving inertia compensation to, for example, a pulse motor driving mechanism. Thereafter, the X-axis (Y-axis) driving device 172 including the pulse motor is driven, so that the head 30 is moved at a speed proportionate to the positional difference between the head 30 and the cursor so as to zero that positional difference.

On the other hand, in the comparator controlling section 163 the value represented by the signal on at least one of the x signal line 156x and y signal line (not shown) is compared with a specified value and when the former value is greater than the latter, the comparator controlling section 163 generates a load pulse and at the same time the signals on the leads 155x, 156x are stored in the direction register 161 and the absolute value register 162, respectively. Immediately after the respective storage, control changing over signals are supplied from the comparison controlling section 163 to the gates 152x, through the registers 161, 162, 153x, respectively, whereby the gates 152x, 153x operate to change over the signal path. Thus, the outputs of the direction register 161 and the absolute value register 162 are led onto the leads 157x, 158x, respectively. The specified value preferably is so set as to become equal to the value of the signal on the signal line 156x which is outputted from the A/D converter in correspondence to a maximum difference in position between the cursor 10 and the head 30 falling within the magnetically followable range, i.e., the range in which the head follow operation can be performed. Such setting of the specified value enables the linear continuous movement of the head 30 at the time when the control changing-over signals have been generated from the registers 161 and 162 and without causing any change in the moving speed and direction of the head 30 at that time. This means that when the drawer or operator moves the cursor 10, even if the operator moves the same at a speed higher than the following speed of the head 30 toward a far-away destination or goal beyond the magnetically followable range, the head 30 continues to move and catch up with the cursor 30, whereby the head-follow operation can be again performed within the magnetically followable range.

As above described, according to the invention, the changing-over of the head-follow operation is carried out by the comparison controlling section 163. It can also be carried out by constituting each of the gates 152x and 153x by a manual change-over switch and permitting the generation therefrom of a load pulse at the time of the change-over thereof. Accordingly, the circuit including the gates 152x, 153x, direction register 161 and absolute value register 162 can be a control changing-over means for performing such a controlling operation as permits the successive producing of an output from the X-axis drive controlling means at the time of changing-over the head-follow operation.

With regard to the above-mentioned informing logic circuit 220, when the output signals of the amplifiers 131x and 131y become substantially zero at the same time, namely, when the follow movement of the head 30 is completed whereby the X- and Y-axes error sensing devices 130x, 130y are in a balanced state and a high level signal indicating co-ordinate read-out mode is generated from the key board 73, a high level signal is produced onto the signal line 221w only of the informing logic circuit 220 to cause only the white color lamp 33w to be lit. When in this state a positional difference or error is made between the cursor 10 and the head 30, one or both of the outputs of the amplifiers 131x and 131y become enable to be recognized as being zero in level. As a result, the signal only on the line 221r becomes high in level to cause the red color lamp alone to be lit. Namely, when the head 30 is following the cursor 10, the red color lamp 33r is lit and, when this head follow movement has been completed, the white color lamp 33w is lit to inform the operator of a completion of the head follow movement.

Figure 10:
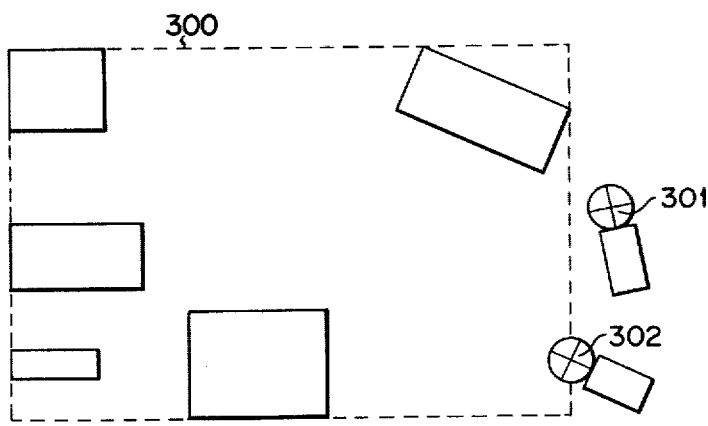
FIG. 10 is a view for explaining the gridding function of the apparatus of FIG. 1.

The co-ordinate read-out mode signal generated from the key board 73 further acts on the read-out control section 181, whereby the output signal from the XY counter 180 counting the pulse generated from the pulse generator 154x is sequentially supplied to the coordinate conversion section 182 and is sequentially converted by it to an absolute co-ordinate thus to be stored in the position register 183a. When a code corresponding to a gridded figure (usually, a straight line) is given to the gridding domain operation section 186 from the key board 73, the section 186 causes the position information as to the gridded figure to be transferred from the grid register 187 to the gridding operation section 188. The gridding operation section 188 sequentially compares the co-ordinate value of the position co-ordinate register 183 with the position information as to the gridded figure and, when the former value is in corresponding relationship to a point on the gridded figure, operates to supply an information command signal to the buzzer 74. Accordingly, when the operator desires to precisely read out rough drafted figures, only if he operates to permit the selection by the key board 73 of the figures 300 desired to be gridded, (as shown in FIG. 10) he can come to know, when the cursor 10 is situated at a position on the grid line, i.e., at the illustrated position 302 not at the illustrated position 301, by the buzzer 74 ringing that the cursor is situated on the grid line and thus can read out the figure 300 as the gridded figures. Note here that such grid line is invisible to the operator, or an imaginary line. Conventionally, there indeed exists a co-ordinate read-out device for compulsively carrying out the gridding operation, but this conventional device has no such an interactory display means as is employed in this invention and additionally the grid line is merely an imaginary line to the operator. The conventional coordinate reading device has therefore the drawbacks that the operator can miss reading-out; and that when he enlarges the space interval (error-dorrection width) for grid-processing, he fails to read out a finely written figure or intricated figure. According to the invention, however, only if he is informed of the existence of a grid line, the operator can precisely can perform a gridding operation by this information and his own judgement thereon. Namely, according to the invention, the operator can greatly increase the grid-processing effect by reading-out interactively.

When a function code corresponding to a figure desired to be read out such as, for example, such a figure as shown in FIG. 11 has been inputted to the function controlling section 189 from the key board 73, the function information is sent to the function operation section 190. When the operator depresses the reading command key of the key board 12 of the cursor 10, the information in the position co-ordinate register 183a denoting the co-ordinate of the position of the head 30 is transferred to the functtion operation section 190. When the necessary numerical value information such as, for example, the diameter of a circle, the dimension of a line, etc. is inputted to the function controlling section 189 from the key board 73, the information thus inputted is transferred to the function operation section 190. When such function information and numerical value information are inputted to the section 190 in a sequential order predetermined as to the figure-drawing function, the section 190 calculates both information to produce point array information necessary to the drawing or depicting of the figure. The information thus produced is stored in the external memory device 80. The function controlling section 189 operates to supply one letter of the letter notation indicating a sequential order of inputting the figure information, to the first-place compartment of the function display 72, thereby to cause display of that letter. For instance, where the figure is a circle, the notation letter "P" is displayed whereby the operator reads the co-ordinates of the center of the circle. Where the notation letter "R" is next displayed, the operater causes the value of the radius of the circle to be inputted to the function controlling section from the key board 73. The first-place compartment of the function display 72 is comprised of 16×16 dot-matrix LED (Light-Emitting Diode) and the second and succeeding place compartments are each comprised of 7-segment LEDs, whereby to display the key-inputted numerical value information. The function display 72 is juxtaposed with the position display 71 designed to always indicate the current position of the head 30. This offers the merits that the displayed items can be easily recognized; and that the operator's missing of the inputting operation can be extremely reduced by such simple mechanism. These merits result in that the displays 71 and 72 play a great role in increasing the interactive features of the apparatus.

When the information of the position co-ordinate register 183a is transferred to the function operation section 190, the co-ordinate domain operation section 183b acts the read point register 184 to store the information simultaneously.

The read point operation section 185 sequentially compares the information of the position co-ordinate register 183a with the contents of the read point register 184, and when the contents of the read point register 184 includes the same value of the information of the position co-ordinate register 183a (namely the value of the present X and Y co-ordinate respectively coincide with the X and Y co-ordinate value which have been readout), the read point operation section 185 transmits a read point signal to the informing logic circuit 220 to cause the green color lamp 33g to be lit. Accordingly, the green color lamp 33g gives an item of information to the operator that the current position of the drawing head is situated on the read point. This enables the operator to look for a read point of the figure by moving the cursor 10 by a way of trail-and-error and also enables the operator to read the figure by the interactive method while observing the lighting and putting-out of the green color lamp 33g. Further, such operational system of the invention also enables the operator to read twice the same point of the figure and also prevents the operator from committing an unintended double-reading of the same point due to his own mistake and missing reading an intended point or points of the figure.

After the reading operation in the above-mentioned manner has been completed, the drawing controlling section 193 upon receiving a signal denoting the drawing mode from the key board 73 transfers to the drawing correction controlling section 192 the point array information read out from the external memory 80. The drawing correction controlling section 192 supplies a pen vertically-driving signal to the vertically pen-driving mechanism 173 and also supplies the point array information to the increment operation section 191. The pen vertically-driving signal is generated correspondingly to the point array information. The increment operation section 191 carries out the increment operation on the basis of the point array information and simultaneously supplies gate changing-over signal to the gates 152x and 153x thereby to change-over the gate. Thus, a signal denoting the rotational direction of the pulse motor and a signal representing the amount of rotation thereof are sent to the gates 152x and 153x, respectively. In this case, those signals are sent out from the increment operation section 191 in correspondence to a change in contents of the XY counter 180. That is, the increment operation section 191 calculates the increment information items ($\Delta x_i = x_{i+1} - x_i$, $\Delta y_i = y_{i+1} - y_i$) from the point array information items ($x_i$, $y_i$) at that time and transmits the codes of + or − of the increment information items to the motor controlling circuit 171 through the gates 152x, 152y. The section 191, further, in consideration of the absolute values $|\Delta x_i|$ of $\Delta x_i$ and $|\Delta y_i|$ of $\Delta y_i$ and for the purpose of keeping the ratio $|\Delta y_i|/|\Delta x_i|$ to be unchanged, transmits voltage signals corresponding to $|\Delta x_i|$ and $|\Delta y_i|$ to the pulse generator through the gates 153x, 153y, respectively and causes those voltage signal to be supplied as pulse signal from the pulse generator to the motor controlling circuit 171. The section 191 at this time operates while sequentially taking the signal from the XY counter 180 into consideration and, at the same time that the head reaches the point ($x_{i+1}$, $y_{i+1}$), produces output signals similar to those mentioned above with respect to $\Delta x_{i+1}$ and $\Delta y_{i+1}$. By successively performing this operation, the head 30 is caused the move on the drawing table 50 in correspondence to said point array information.

The drawing on depicting of the figure is carried out in accordance with the above-mentioned operation. When the correction switch 61a is depressed in the couse of such drawing operation, a correction signal is generated from the correction switch 61a and in response thereto the drawing-correction controlling section 192 supplies to the vertically pen moving mechanism 173 a signal for keeping the pen in an "up" state. Thus, the pen is held in "up" position irrespective of the drawing information. Next, when a correction signal is supplied to the lamp driving circuit 230r, this circuit operates to cause the red color lamp 33r to be lit. The crossed rule indication on the glass plate 33a is displayed by this lighting on the draft or manuscript 1 through the Fresnel lens 33b. At this time, the drawing head 30 does not actually draw but operates or moves in the same manner as in actual drawing. The operator can recognize the movement locus of the head 30 by seeing the crossed rule indication displayed by the red color lamp 33r. When the correction switch 61b is depressed, a drawing stoppage signal is generated from the switch 61b to cause the drawing correction controlling section 192 to stop the transfer of the point array information to the increment operation section 191 and also stop the transmission of its output signals to the gates 152x, 153x. At this time, the address in the external memory 80 at which is stored the point array information already read out by this time is sent into an address register provided within, for example, the external memory 80. Thus, when the reading-out of the drawing information is reopened, it starts from the address information stored in the address register. By providing the above-mentioned correction function to the apparatus it becomes possible for the operator to perform the adding and correcting operation as to the drawing information stored in the external memory 80 without necessitating a display device such as CRT. When under the mode of drawing depiction the correction switch 61a is depressed, the operator can recognize the locus of the head 30 moving in a "depiction-free" state by the crossed rule indication projected onto the draft by the lamp provided on the head 30. Thus, if the operator pushes the correction switch 61b at a time immediately preceding to a time which corresponds to the figure portion desired to be corrected, he can stop the movement of the head 30 at that preceding time and thereby change-over the drawing or depiction mode to the reading mode. In this mode thus changed over, the reading for correction of the figure information can be performed. The information thus read is successively stored in the external memory 80.

As explained above, the invention can provide an inexpensive, small-sized and highly operable interactive graphic apparatus in which the three component elements of digitizer, controlling device and plotter are integrally incorporated into a desk-like form and which has the excellent interactive feature without using the CRT display device. Further, the apparatus of the invention is provided with the automatic head-follow function which has the function to move the head beyond the magnetically followable region, so that the movement of the cursor is not limited to obtain the effect that the apparatus has high operability. Further, the apparatus of the invention is equipped with the function to inform the operator whether the head-following operation is completed or incompleted. Since such information is issued from the head position on which the operator's attention is concentrated, his judgement on the head position can be easily made with a consequence that the operating efficiency is improved. Further, since the apparatus of the invention has the correcting function, the figure portion erroneously read can be easily corrected. Further, since the display of such figure portion is made not by using an expensive CRT device but simply by the lighting of the lamp provided on the head, the apparatus can be small-sized and reduced in manufacturing cost. Further, since the apparatus has the function to grid a plurality of figures within a predetermined frame, it can conveniently be used to produce especially a block copy. Further, since the apparatus has the read point informing function, the operator can be safe from the unintended double reading of the same figure point and also safe from missing the intended reading of figure points and further can precisely read twice the same figure point at exactly the same position.

What we claim is:

1. An interactive graphic apparatus which comprises an openable reading table having a reading section constituted by a transparent plate, a cursor provided on said reading table in a manner that it is manually movable on said reading table, a drawing head provided beneath said reading table in a manner that it is movable in X and Y directions and having a drawing instrument and a sensor movable in X and Y directions for sensing the energy from said cursor, a drawing table disposed beneath said drawing head, and a controlling device having a key board, and a display means and an external memory means to control the reading and depicting of a drafted drawing item, and which is constructed into a desk-like structure, and the external memory means is located in front of the desk-like structure.

2. An interactive graphic apparatus according to claim 1 in which a function display section in said display means comprises at least one display portion of dot-matrix type in which the sequential order of data items to be inputted into the apparatus is displayed.

3. An interactive graphic apparatus according to claim 1 in which said head has a plurality of informing lamps.

4. An interactive graphic apparatus according to claim 3 in which one of said plurality of lamps provided for said head projects a center of said sensor onto the backside of a draft mounted on said reading section.

5. An interactive graphic apparatus according to claim 1 in which said drawing instrument has a plurality of tubular-tip drawing pens and at a common abutting plate is provided against which said pen abuts during the time period in which the drawing operation is not carried out.

6. An interactive graphic apparatus which comprises an openable reading table having a reading section constituted by a transparent plate, a cursor provided on said reading table in a manner that it is manually movable on said reading table, a drawing head provided beneath said reading table in a manner that it is movable in X and Y directions and having a sensor for sensing an energy from an energy generating means of said cursor, an informing means including at least one light emitting member capable of being operatively lit, and a drawing instrument, a drawing table disposed beneath said reading table, and a controlling device having a key board, display means and external memory means to control the reading and formal drawing of a drafted drawing, and which is constructed into a desk-like structure.

7. An interactive graphic apparatus according to claim 6, which comprises an X-axis error detected means for detecting an X-axial direction component of a signal indicating the positional error of said reading head with respect to said cursor, a Y-axis error detecting means for detecting a Y-axial direction component of a signal indicating the positional error of said reading head will respect to said cursor, and an informing means which, when both of an output of said X-axis error detecting means and an output of said Y-axis error detecting means have one common value of zero and nearly zero and when either of both said outputs fails to have one value of zero and nearly zero, gives correspondingly different information to an operator.

8. An interactive graphic apparatus according to claim 7 in which said informing means includes at least two lamps different in color which lamps are provided on said reading head.

9. An interactive graphic apparatus according to claim 6, which further comprises a driving circuit for causing an output of said X-axis error detecting means to be supplied to an X-axial drive controlling means and causing an output of said Y-axis error detecting means to be supplied to a Y-axial drive controlling means, thereby to drive said reading head in a direction permitting said positional error to become zero, a gate for electrically disconnecting said driving circuit to control the same in response to a drawing signal, and a manually changeableover correction switch for controlling the operation of said gate and the operation of a vertically drawing-instrument moving mechanism.

10. An interactive graphic apparatus according to claim 6, which further comprises a position co-ordinate register for sequentially storing the position of said reading head, a grid register for storing information as to a desired gridded drafted figure such as a straight line, inputted from, for example, a key board, and a grid operation section which, when the value of said position co-ordinate register is contained among information stored in said grid register, generates an output signal for driving said informing means.

11. An interactive graphic apparatus according to claim 6 which further comprises a read-point co-ordinate register for storing the co-ordinate of a read point, a position co-ordinate register, and a read-point operation section which, when the value of said position co-ordinate register is contained among the values of said read-point register, generates an output signal for drawing said informing means.

12. An interactive graphic apparatus according to claim 10 in which said informing means includes lamps which are provided on said reading head.

13. An interactive graphic apparatus according to claim 6 in which a magnetic energy is generated from said cursor and a hall elements are used as sensing elements of said reading head for sensing said magnetic energy.

14. An interactive graphic apparatus which comprises a head movable in X and Y axial directions and having a sensor for sensing energy from a cursor, X and Y axially driving means for driving said head, X and Y axial drive controlling means for controlling said X and Y axially driving means, X and Y axes error detecting means for detecting the positional error of said head with respect to said cursor, a circuit for causing outputs of said X and Y axes error detecting means to be inputted to said X and Y axially driving means, thereby to drive said head in a direction permitting said positional error to become zero, and a control changing-over means for electrically disconnecting said circuit to permit successively producing the outputs of said X and Y axial drive controlling means at the time of said electrical disconnection.

15. An interactive graphic apparatus according to claim 14 which further comprises a means which includes a comparing means for comparing signals denoting the absolute value of at least one of X and Y error signals from said X and Y axis error detecting means with a specified value of signal level and from which when the level of said signal has become higher than said specified value, an output signal to electrically disconnect said circuit is generated.

16. An interactive graphic apparatus according to claim 14 which further comprises a storing means for converting the output signals of said X and Y axes error detecting means into a digital signals and storing said digital signals simultaneously with said electrical disconnection of said circuit.

* * * * *